United States Patent
Mecocci et al.

(10) Patent No.: US 12,287,018 B2
(45) Date of Patent: Apr. 29, 2025

(54) BRAKE PAD, BRAKE CALIPER ASSEMBLY, DISC BRAKE

(71) Applicant: Brembo S.p.A., Bergamo (IT)

(72) Inventors: Andrea Mecocci, Bergamo (IT); Stefano Zaghi, Bergamo (IT); Nicolas Minucci, Bergamo (IT); Alberto Pendesini, Bergamo (IT)

(73) Assignee: Brembo S.p.A., Bergamo (IT)

( * ) Notice: Subject to any disclaimer, the term of this patent is extended or adjusted under 35 U.S.C. 154(b) by 367 days.

(21) Appl. No.: 17/930,122

(22) Filed: Sep. 7, 2022

(65) Prior Publication Data
US 2023/0073353 A1    Mar. 9, 2023

(30) Foreign Application Priority Data
Sep. 8, 2021  (IT) .......... 102021000023165

(51) Int. Cl.
*F16D 65/00*  (2006.01)
*F16D 55/00*  (2006.01)
*F16D 65/095*  (2006.01)

(52) U.S. Cl.
CPC ......... *F16D 65/0068* (2013.01); *F16D 55/00* (2013.01); *F16D 65/095* (2013.01); *F16D 2055/0016* (2013.01)

(58) Field of Classification Search
CPC ............... F16D 65/0068; F16D 65/095; F16D 2055/0016; F16D 55/00
USPC ............ 188/73.1, 73.2, 73.31, 73.44, 73.45, 188/250 B, 250 D, 250 F, 250 G
See application file for complete search history.

(56) References Cited

U.S. PATENT DOCUMENTS

| | | | |
|---|---|---|---|
| 3,500,967 A | 3/1970 | Nolan | |
| 8,556,046 B2* | 10/2013 | Ciotti | F16D 65/095 188/250 F |
| 2011/0127126 A1* | 6/2011 | Ciotti | F16D 65/095 188/250 F |

(Continued)

FOREIGN PATENT DOCUMENTS

EP    3559495 B1    10/2020

OTHER PUBLICATIONS

Italian Patent and Trademark Office, Search Report in Application No. IT202100023165, dated Mar. 2, 2022, 9 pages, Munich.

*Primary Examiner* — Christopher P Schwartz
(74) *Attorney, Agent, or Firm* — Marshall & Melhorn, LLC

(57) ABSTRACT

A brake pad may have at least one plate and at least one friction material supported by the plate. The friction material surface may have a barycenter. The plate may have a first slot and a second slot. The first slot may have a first slot edge adapted to accommodate a first pin mounted on the caliper body. The second slot may have a second slot edge adapted to accommodate a second pin mounted on the caliper body. In a forward braking condition, the brake pad rests on the first pin with a first slot first portion, and the brake pad rests on the second pin with a second slot first portion. The first slot is arranged in a radially outer position with respect to the barycenter and the second slot is arranged in a radially inner position with respect to the barycenter. The first slot and the second slot may be radially external with respect to a barycenter circumference centered on a rotation axis and passing through a barycenter.

12 Claims, 13 Drawing Sheets

(56) References Cited

U.S. PATENT DOCUMENTS

| | | | |
|---|---|---|---|
| 2012/0043168 A1* | 2/2012 | Narayanan V | F16D 65/095 |
| | | | 188/250 F |
| 2015/0041259 A1* | 2/2015 | Ishizuka | F16D 55/22655 |
| | | | 188/73.1 |
| 2016/0273599 A1 | 9/2016 | Loos et al. | |
| 2018/0195569 A1 | 7/2018 | Dreher et al. | |
| 2020/0149600 A1 | 5/2020 | Crippa et al. | |
| 2023/0076059 A1* | 3/2023 | Mecocci | F16D 65/095 |

* cited by examiner

BRAKE PAD, BRAKE CALIPER ASSEMBLY, DISC BRAKE

FIELD

The present invention relates to a brake pad, as well as to a brake caliper assembly, as well as to a disc brake for a vehicle.

BACKGROUND

In a disc brake, an axial direction around which a brake disc rotates, a radial direction, substantially orthogonal to said axial direction, and a tangential or circumferential direction, orthogonal to both said axial direction and said radial direction, are defined to substantially form a cylindrical coordinate system.

Known brake calipers are generally provided with pads adapted to engage a braking band of the brake disc being associable with the brake caliper to cause the vehicle on which the brake caliper is installed to slow down. The pads can be supported by pins, connected to the body of the brake caliper, and therefore can include eyelets, in which the pins are inserted with clearance, so as to allow the pads to slide along them, when subjected to the bias of appropriate thrust means. Moreover, such brake calipers usually comprise at least one pad spring which acts between the caliper body and the pad, so that under braking release conditions, the pad is always in contact with the pins.

According to a known type of pads, the pins also have the function of transmitting the braking force to the brake caliper itself.

The plate of such a type of pads comprises a pair of side ears, which extend laterally in a tangential direction, in which the eyelets intended to accommodate the pins are made. Said side ears are usually made on a tangentially outer portion and radially inner portion, respectively, below the barycenter of the friction surface of the pad abutting on the braking band of the brake disc, and are aligned along the tangential direction, at the same radial distance from the brake disc axis.

The eyelets usually have a polygonal shape with rounded or beveled corners. The pins supporting the pads are instead usually cylindrical in shape with a circular section. The distance and size of eyelets and pins are selected so that, during the braking action, the pad is put in traction and transmits the braking force to one of the two pins, while the other pin forms a radial support. In particular, the eyelets are positioned so as to be both crossed, in a front view, by a circumference centered on the disc rotation axis having a radius equal to the distance between the disc axis and the barycenter of the pad to which the resulting friction force between the brake pad and the brake disc is applied.

By adopting such types of pads of known type, it was found that the constraint and load conditions of the pad allow not only to generate the braking force between pad and disc during the braking action, but also avoid a detachment between pin and pad during the braking release, thus avoiding hitting phenomena in the radial direction.

However, it was found that the constraint and load conditions of such types of pads of known type promote the onset of mechanical vibrations between pads, pins, caliper body and disc, which are the cause of the typical whistle generation phenomena at low frequency, typically between 1.5 and 4.25 kHz, during the braking action.

Therefore, there is a need to devise solutions to reduce or eliminate such whistles, by means of constructional solutions that "shift" the vibration frequencies to values other than those natural of the disc.

Therefore, there is a need to manufacture brake pads, as well as brake caliper assemblies, as well as disc brakes for a vehicle having a minor or no tendency to generate whistles during the braking action.

The problem underlying the present invention is thus to devise a brake pad, a brake caliper assembly, as well as a disc brake, which have structural and functional features such as to meet the aforesaid needs while obviating the drawbacks mentioned with reference to the prior art and to meet the aforesaid felt needs.

SUMMARY

The present invention aims to provide a brake pad, as well as a brake caliper assembly, as well as a disc brake for a vehicle.

This and other objects and advantages are achieved by a brake pad, as well as a brake caliper assembly, as well as a disc brake according to the claims.

Some advantageous embodiments are the subject of the dependent claims.

From the examination of this solution it emerged that, during the braking action between pad and brake disc, an arrangement of the pad slots in which respective pins are accommodated, being radially external with respect to a circumference centered on the rotation axis of the disc and having a radius equal to the distance between the barycenter of the pad and the rotation axis of the disc, allows reducing or eliminating the tendency to the onset of whistling phenomena causing annoying and undesired noises for the driver and for those close to the vehicle when braking.

From the examination of this solution it emerged how, by virtue of an arrangement of the pad slots in a radially inner position with respect to a first tangential direction, parallel to the tangential direction T-T and tangent to the upper edge of the friction material, it is possible to reduce the onset of vibrational frequencies that activate whistling phenomena.

Furthermore, the suggested solutions allow obtaining a caliper assembly and a brake disc with a low tendency to show vibrational frequencies that activate the whistling phenomena.

Still further, due to the suggested solutions it is possible to obtain a brake pad with high mechanical strength.

DESCRIPTION OF THE DRAWINGS

Further features and advantages of the brake pad, the caliper assembly and the disc brake will become apparent from the description below of preferred embodiments thereof, given by way of indicative, non-limiting examples, with reference to the accompanying drawings, in which.

DETAILED DESCRIPTION

Figure 1:
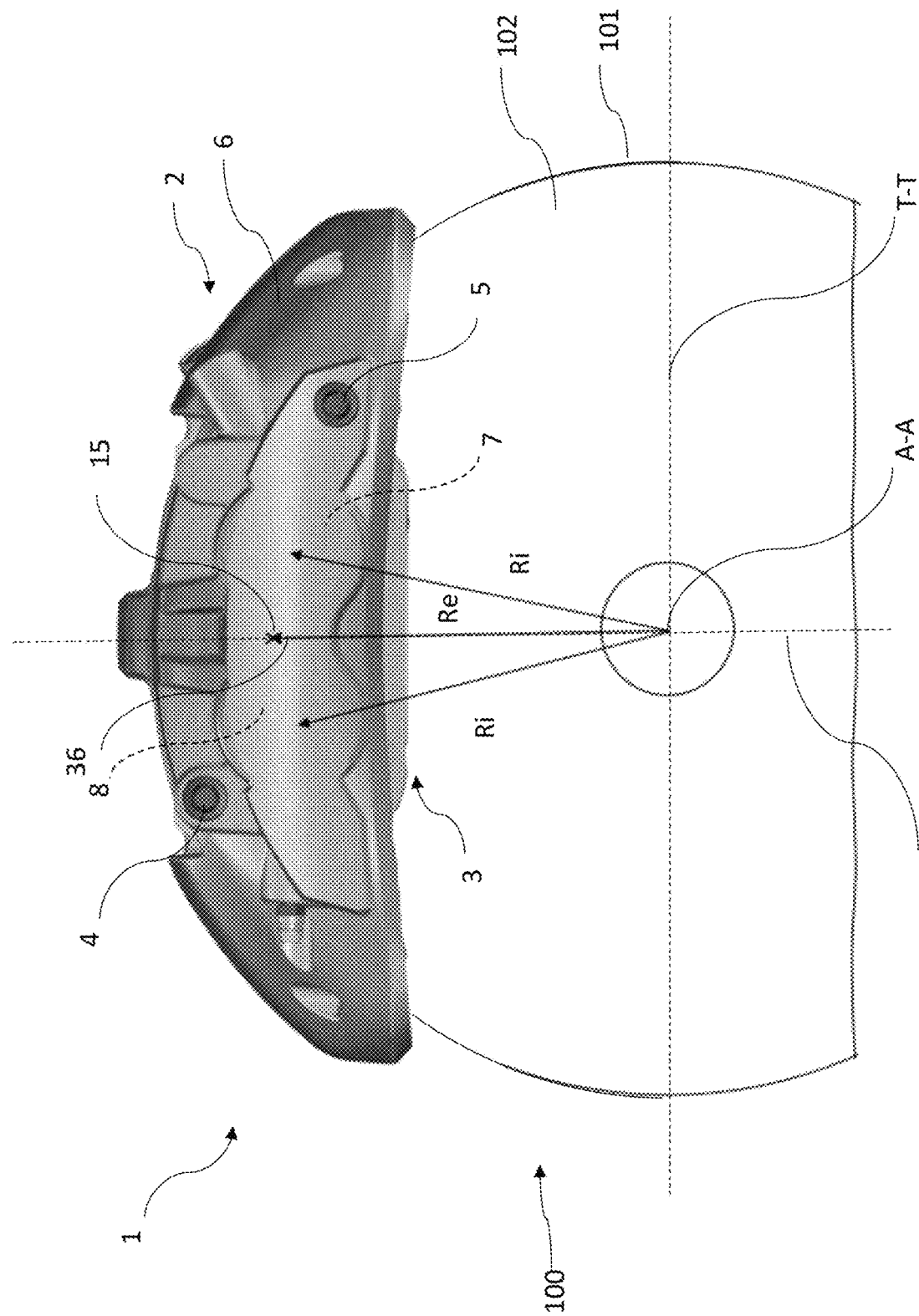
FIG. 1 shows a front view of a disc brake according to present invention.
Figure 2:
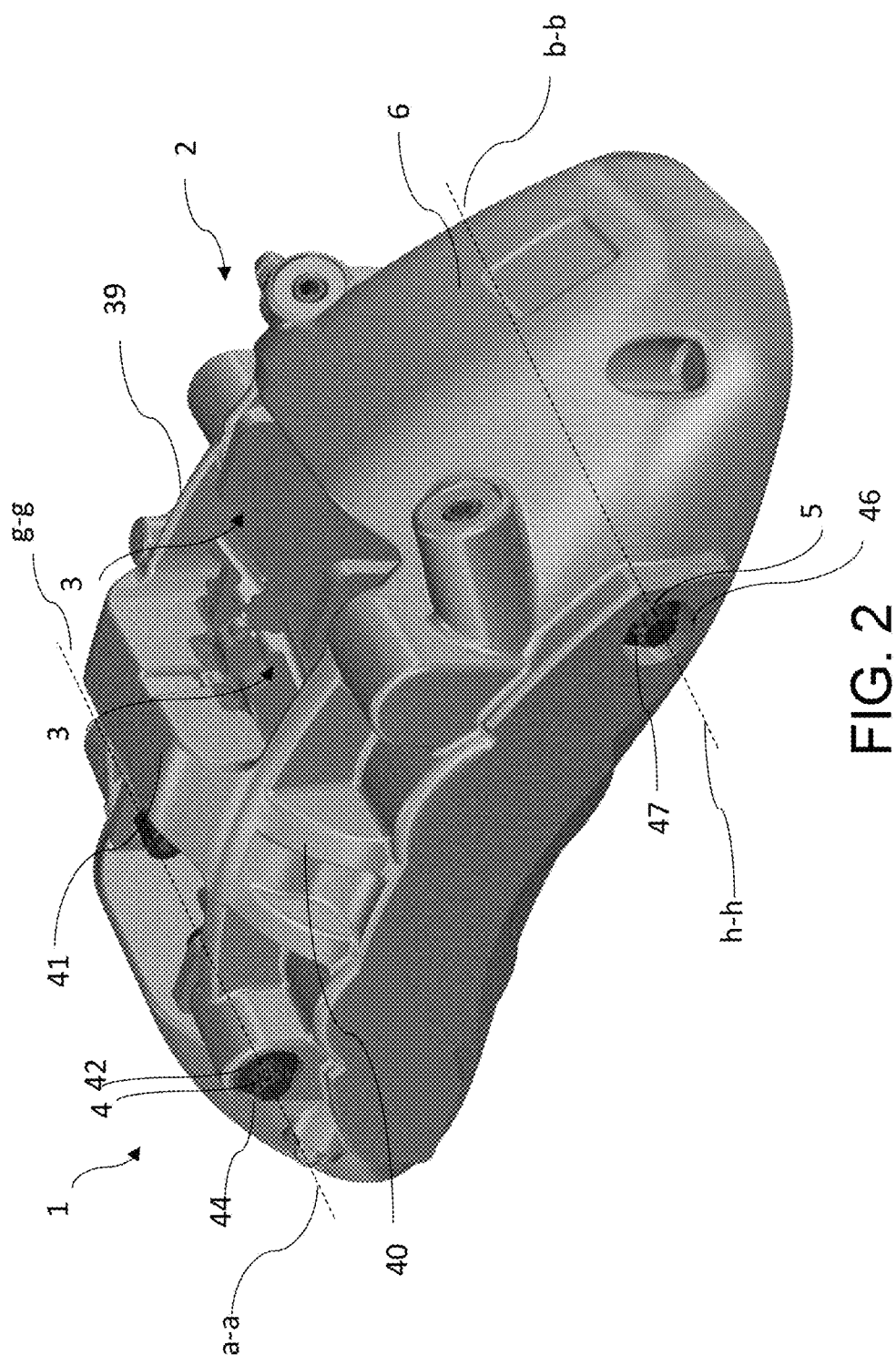
FIG. 2 shows an axonometric view of a brake caliper assembly according to the present invention.
Figure 3:
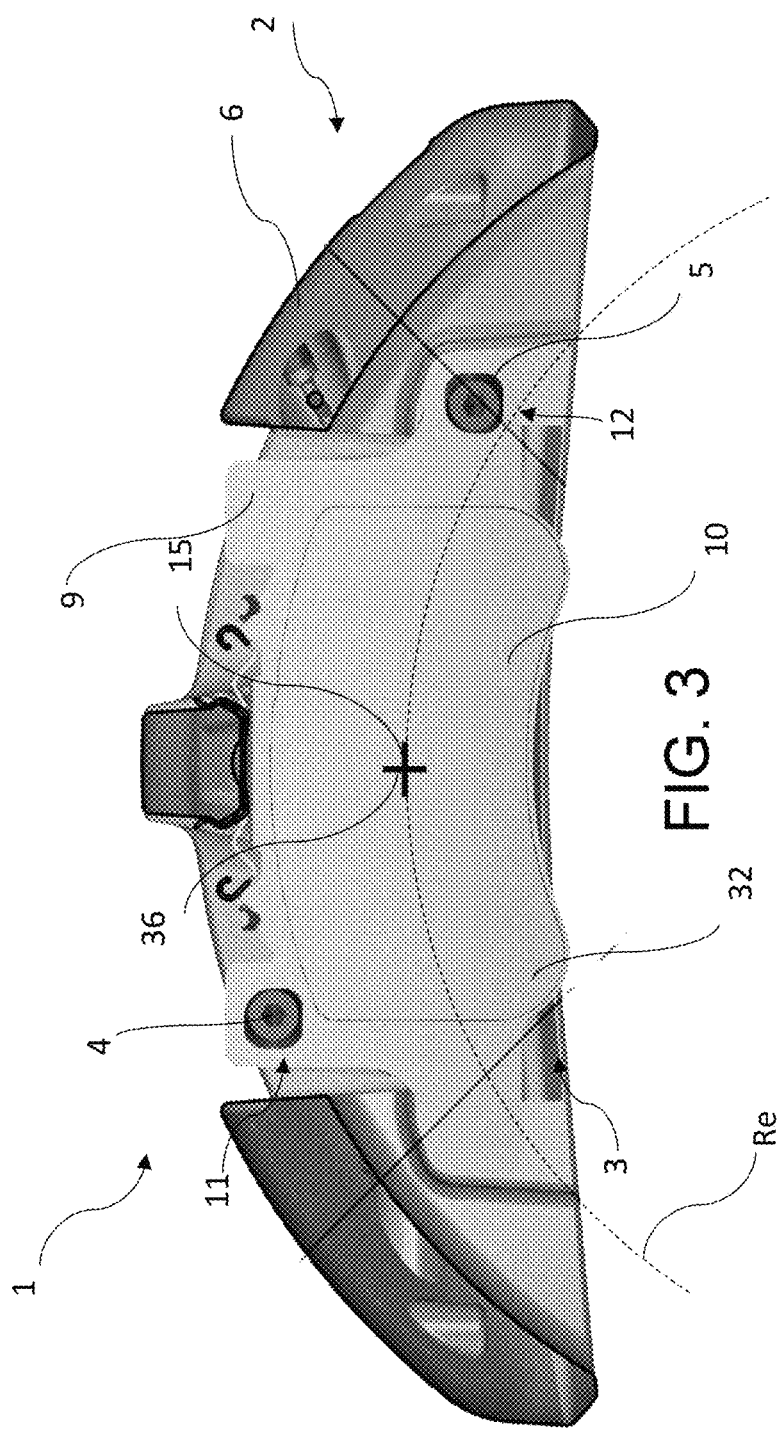
FIG. 3 shows a partially sectioned front view of the caliper assembly in FIG. 2 in which a brake pad ac-cording to present invention is shown.
Figure 4:
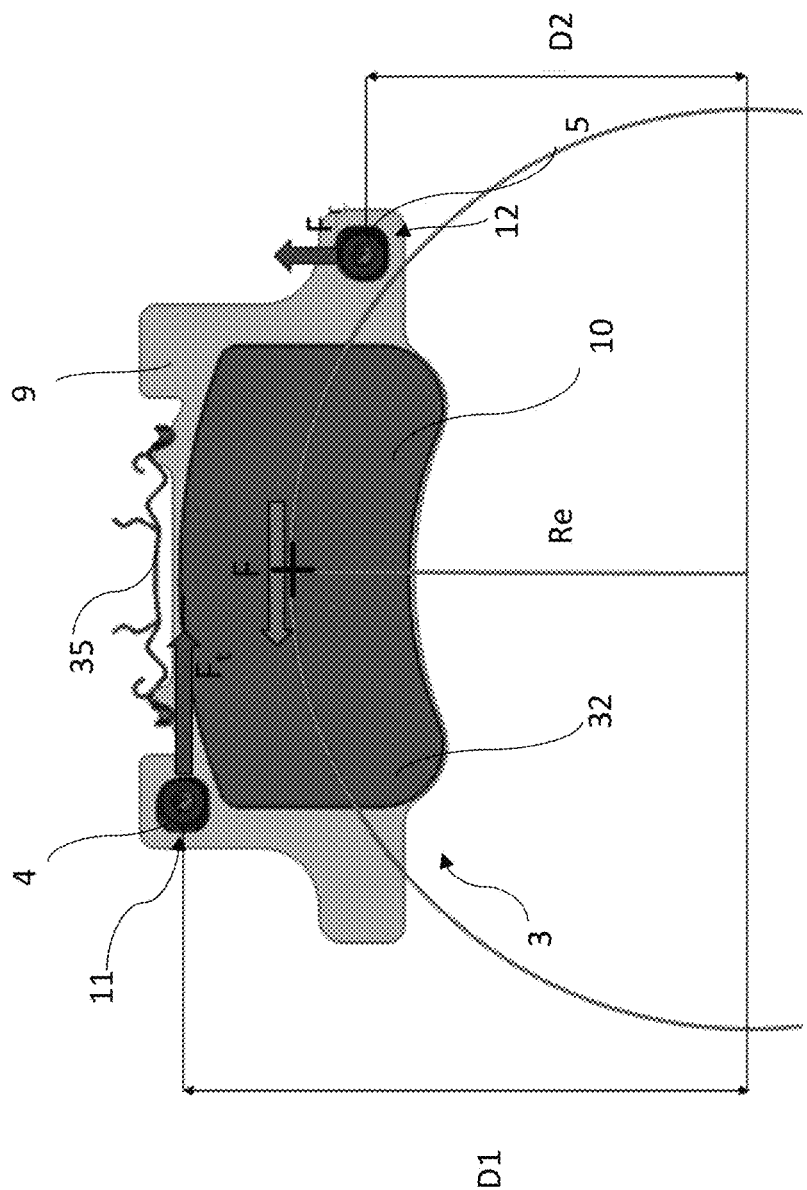
FIG. 4 shows a front view of a brake pad according to the present invention, in which the resultant of the friction force between the pad and the disc brake applied in the barycenter of the friction material surface, as well as in the thrust center of the caliper assembly, the radial constraint reaction force discharged on a second pin, and the tangential force discharged on a first pin are shown.
Figure 5:
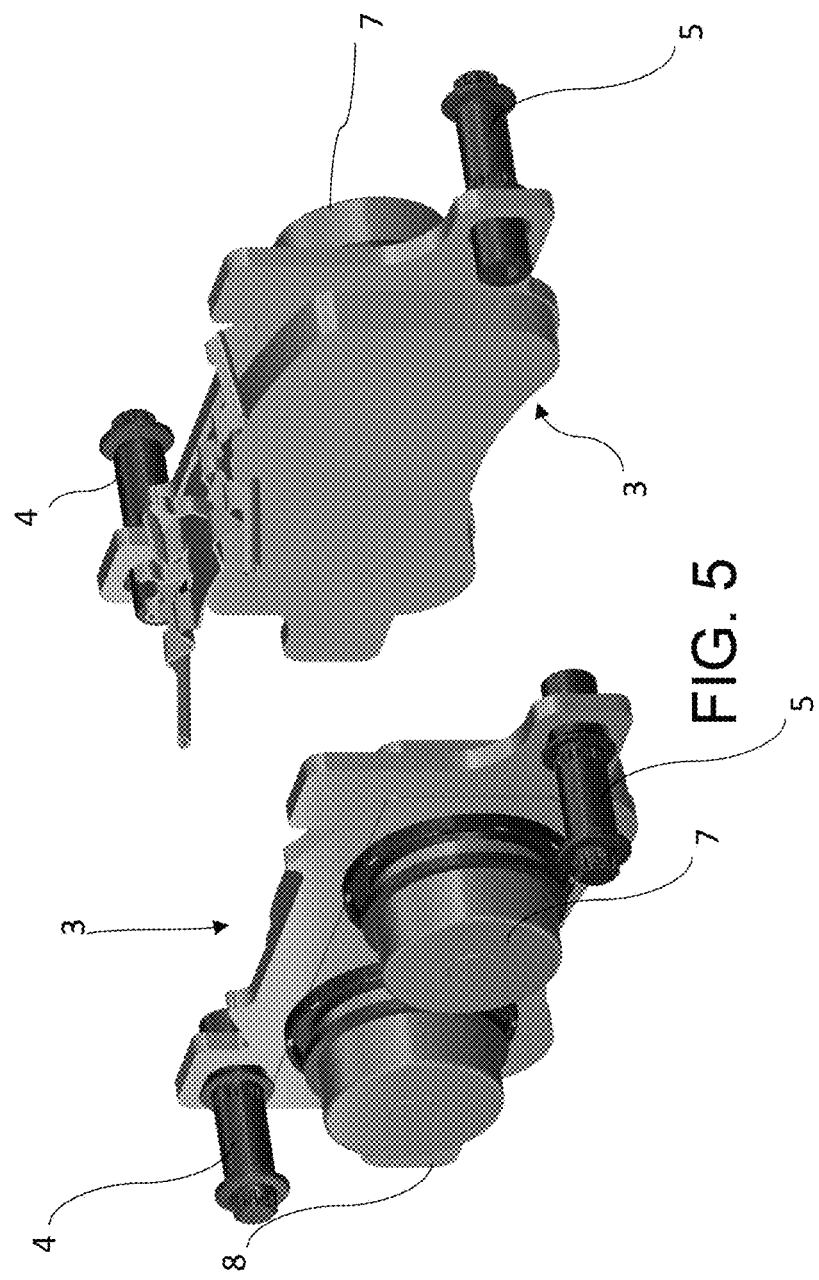
FIG. 5 shows an axonometric view of the brake pad in FIG. 4 and a further specular brake pad with which respective thrust devices are associated.
Figure 6:
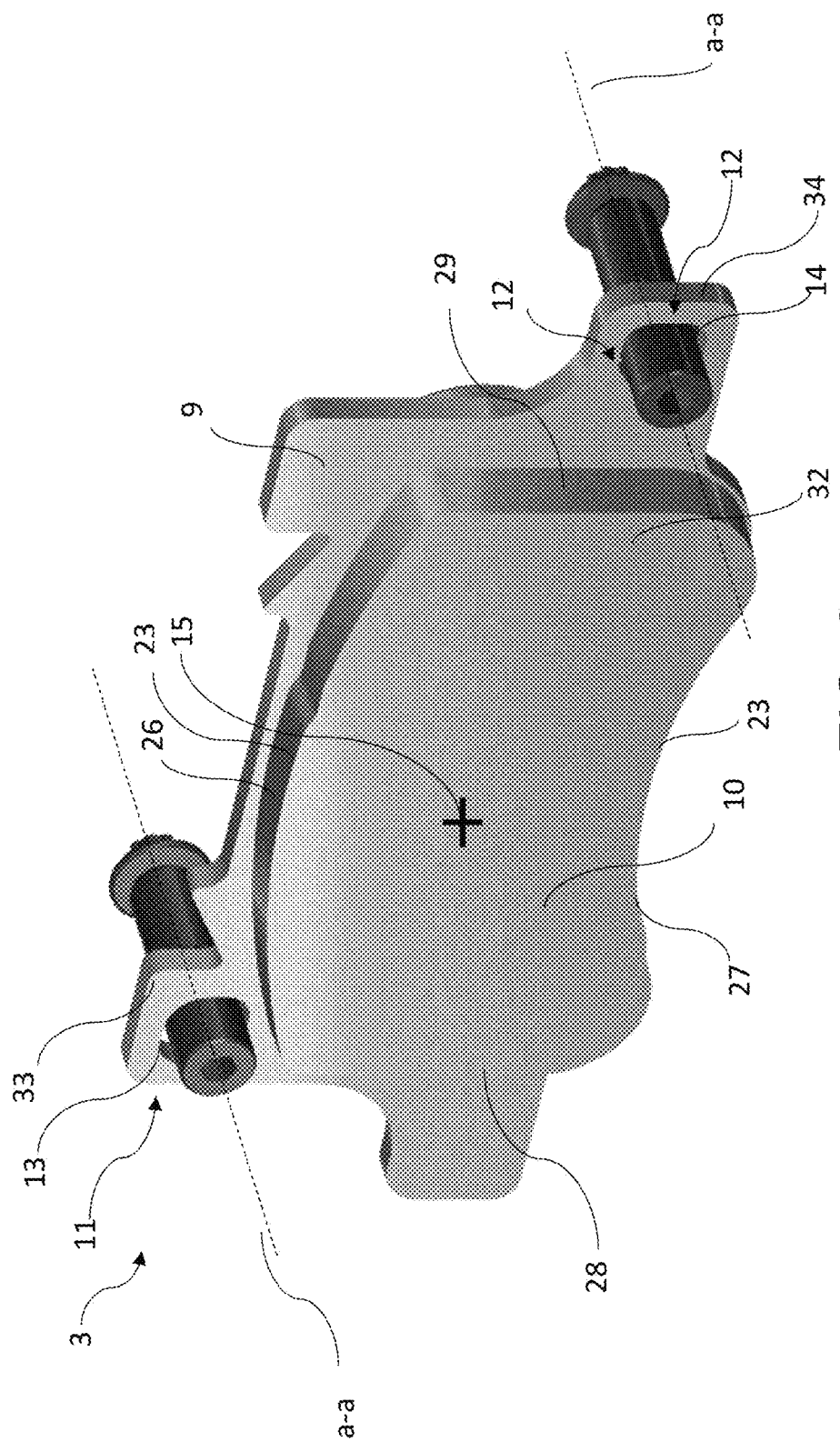
FIG. 6 shows an axonometric view of a brake pad according to present invention.
Figure 7:
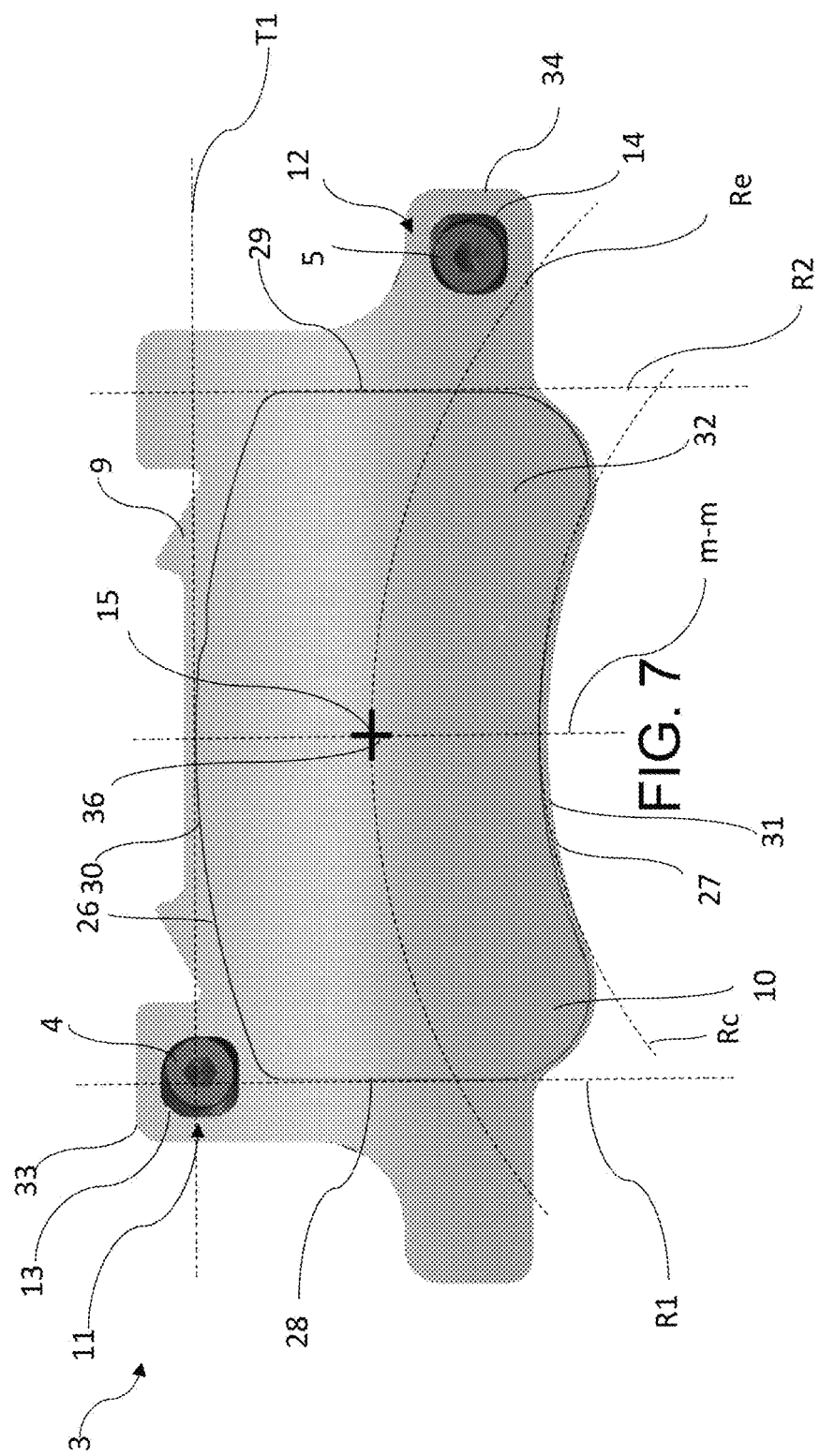
FIG. 7 shows a front view of the brake pad in FIG. 6.
Figure 8:
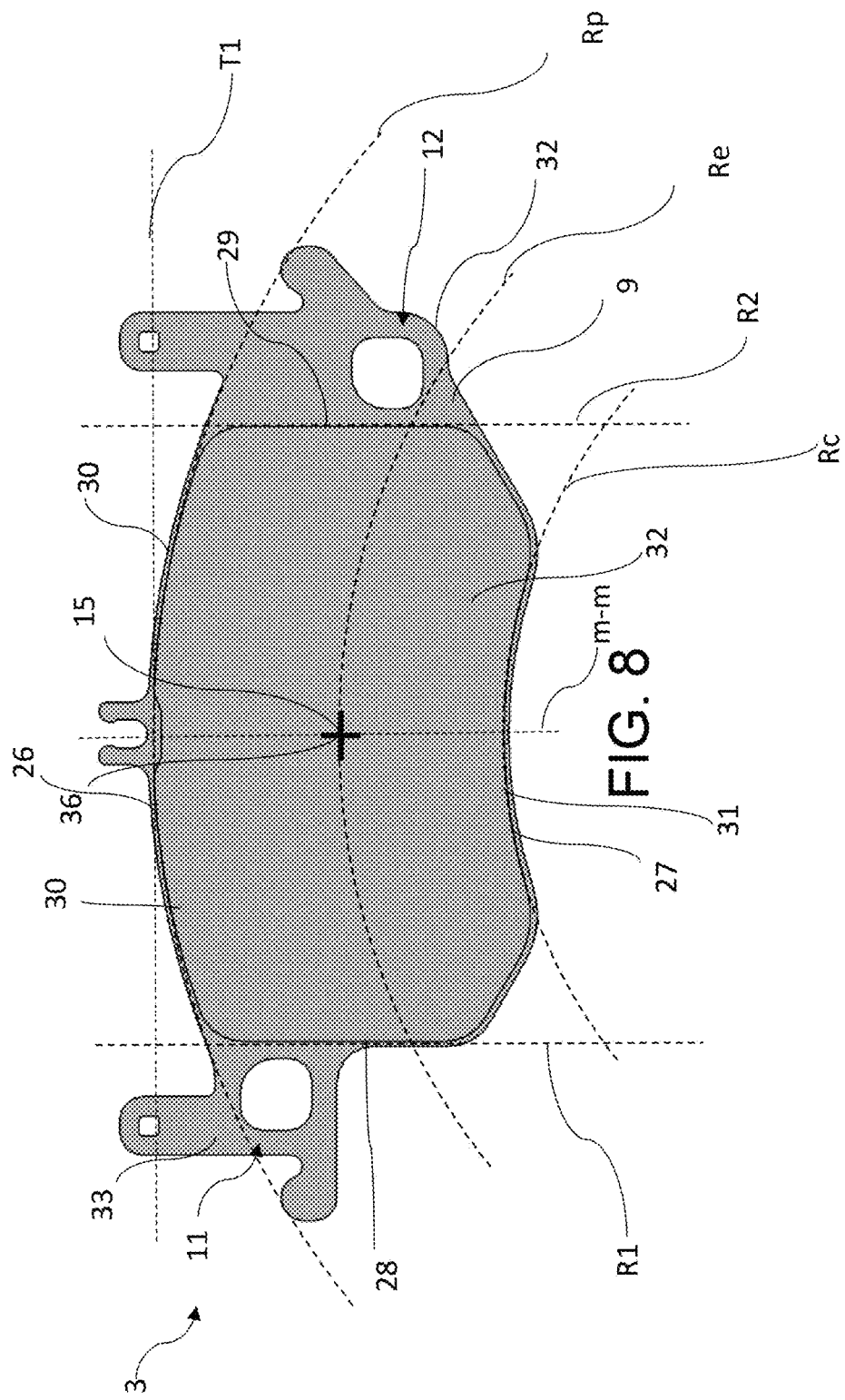
FIG. 8 shows a front view of the brake pad in FIG. 6 according to a second embodiment.
Figure 9:
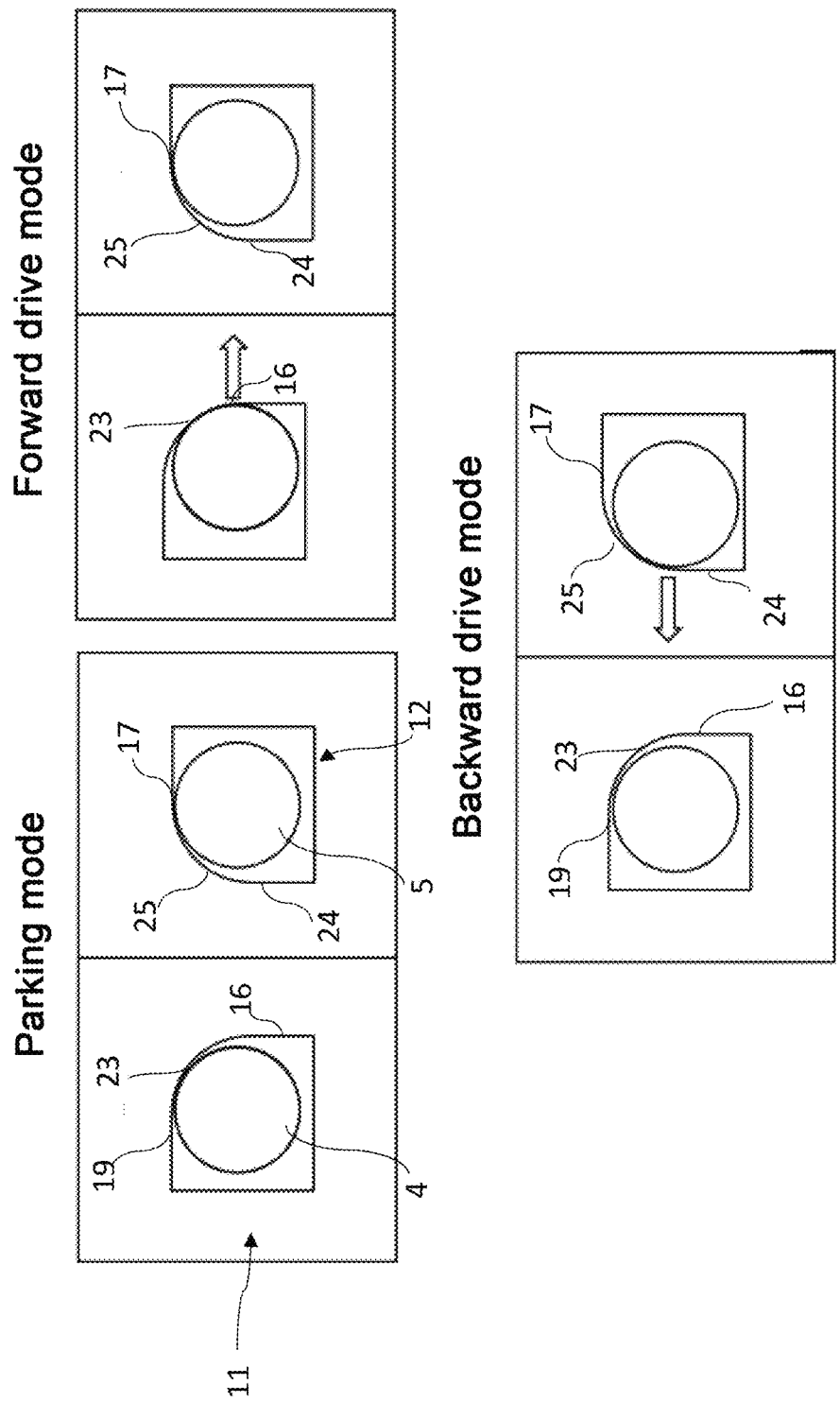
FIG. 9 shows the first and second slots of the brake pad, according to an embodiment of the present invention, in which the pad is pushed during a forward braking by discharging the tangential force on the first pin with a tangentially inner portion of the first slot, and in which the pad is pushed during a reverse braking by discharging the tangential force on the second pin with a tangentially inner portion of the second slot, and in which during the forward braking the pad discharges the radial force on the second pin with a second slot radially outer portion, and in which during a reverse braking, the pad discharges the radial force on the first pin with a first slot radially outer portion.
Figure 10:
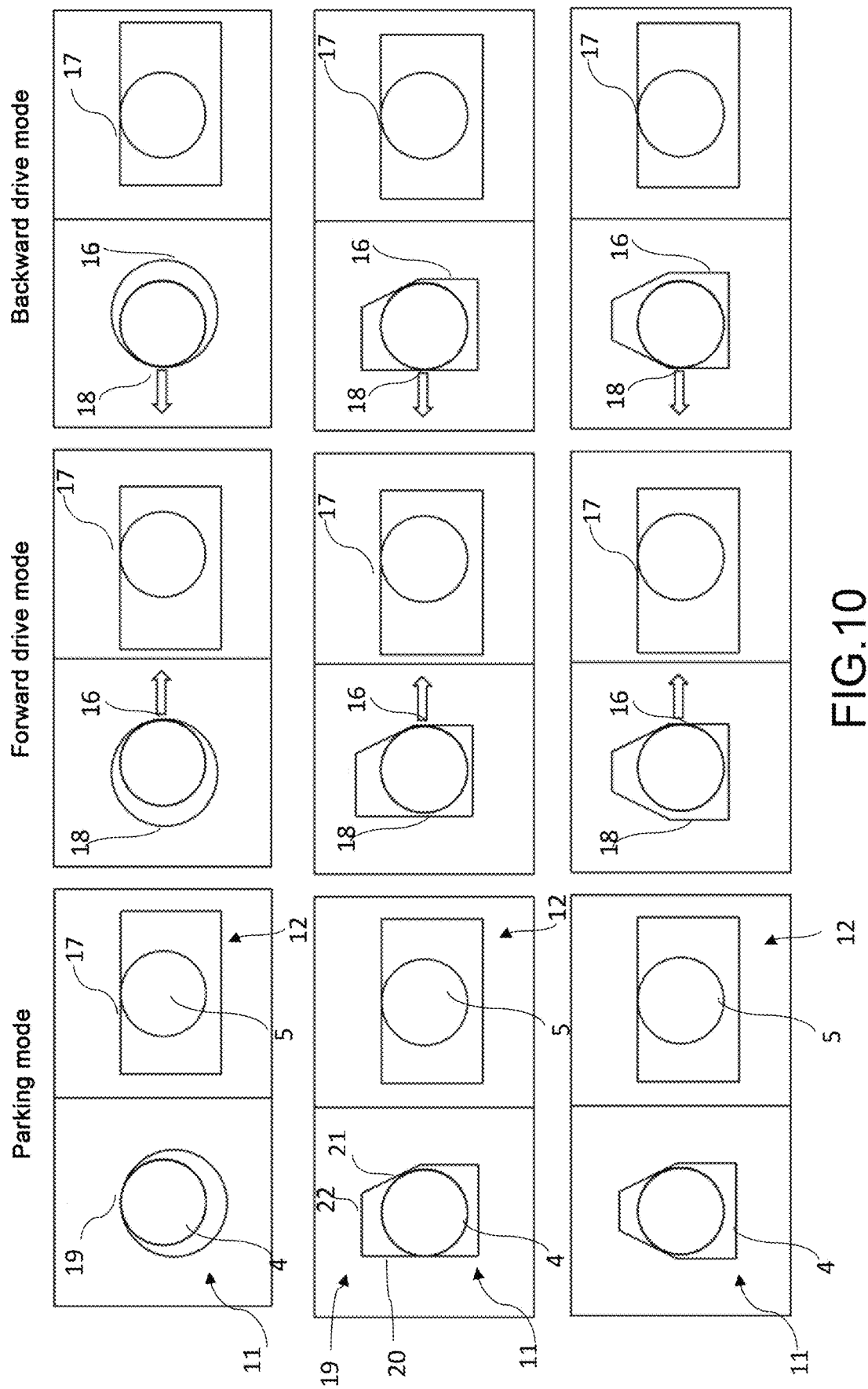
FIG. 10 shows the first and second slots of the brake pad, according to an embodiment of the present invention, in which the pad is pushed during a forward braking by discharging the tangential force on the first pin with a tangentially inner portion of the first slot, and in which the pad is pulled during a reverse braking by discharging the tangential force on the first pin with a tangentially outer portion of the first slot, and in which during both forward and reverse braking the pad discharges the radial force on the second pin with a second slot radially outer portion.
Figure 11:
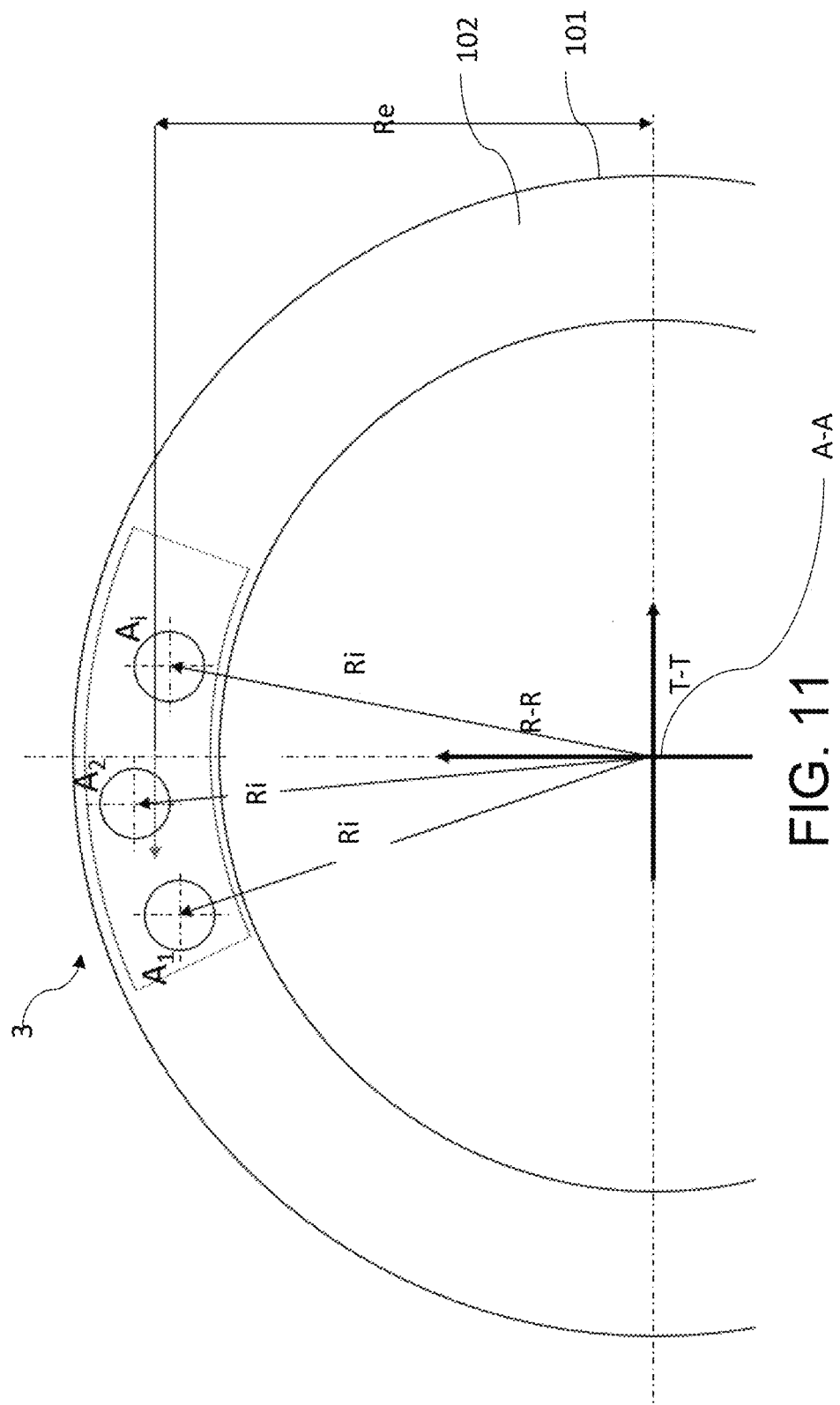
FIG. 11 diagrammatically shows a brake pad and a brake disc, in which the barycenter of the pad and the thrust center of the caliper assembly are shown.
Figure 12:
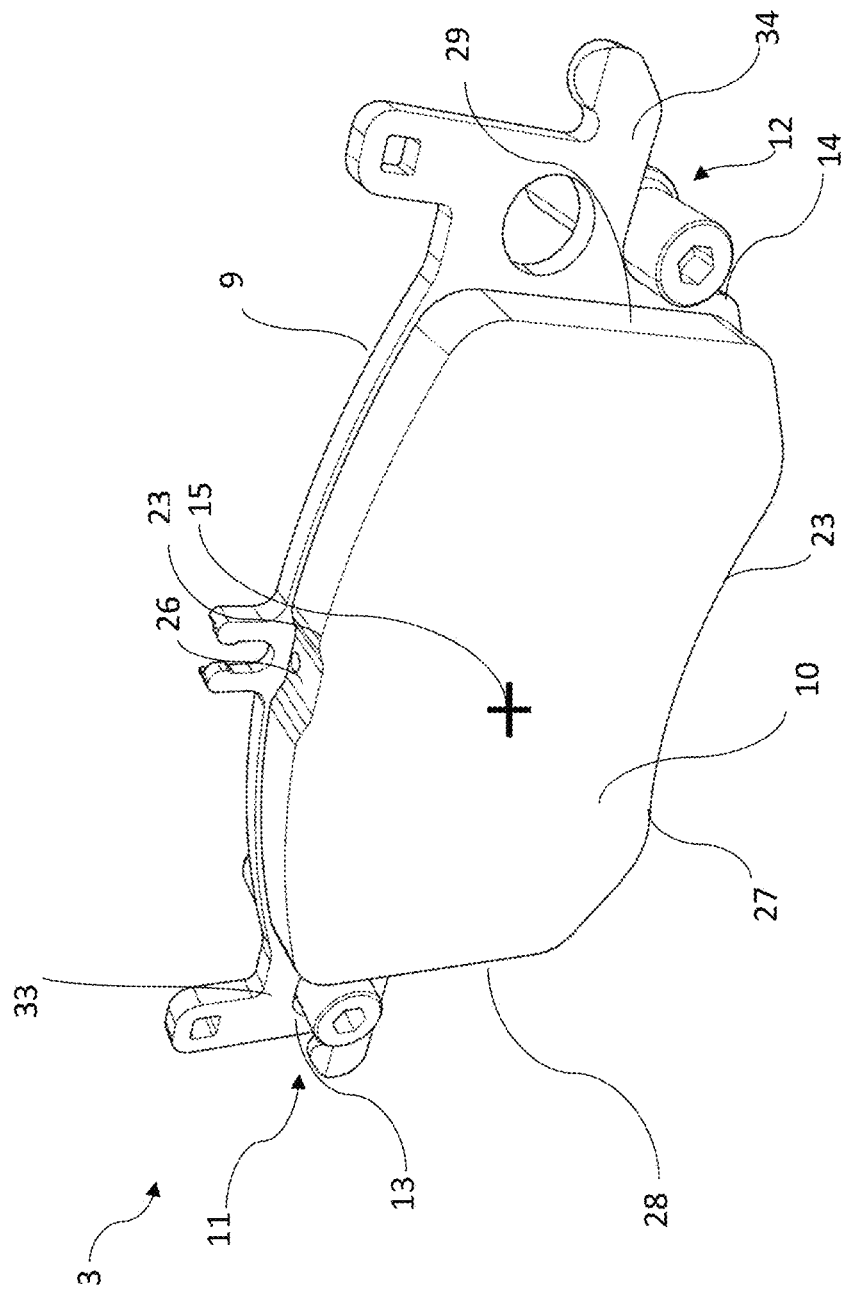
FIG. 12 shows an axonometric view of a brake pad according to present invention, in which the second slot is partially open.
Figure 13:
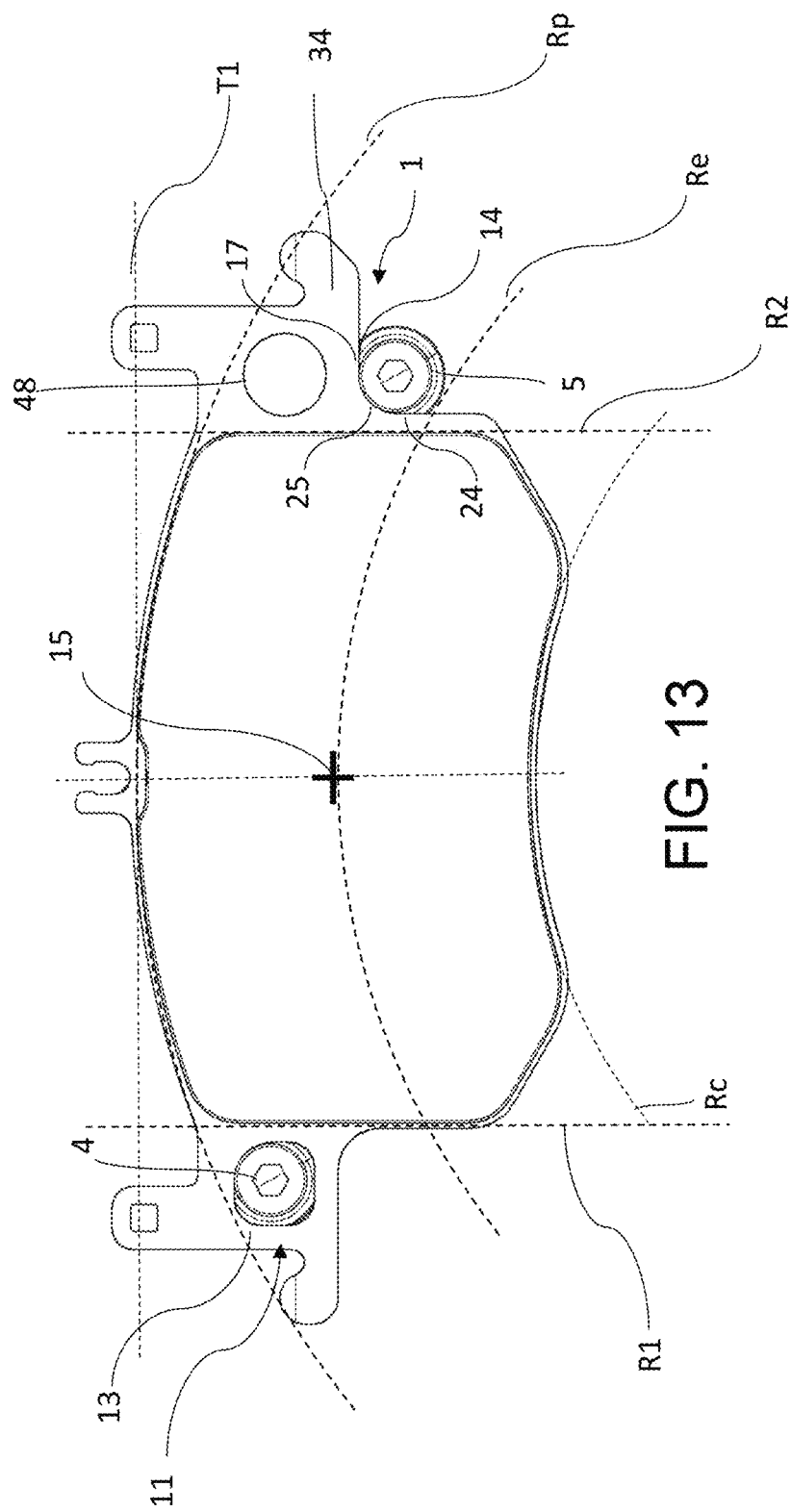
FIG. 13 shows a front view of the brake pad in FIG. 12.

In accordance with a general embodiment, a brake pad 3 for a brake caliper 2 is provided, in which said brake caliper 2 comprises a caliper body 6 adapted to be arranged straddling a brake disc 101.

Said brake pad 3 defining an axial direction A-A, either coinciding with or parallel to the rotation axis of the brake disc 101, a radial direction R-R, orthogonal to the axial direction A-A, and a tangential direction or a circumferential direction T-T, orthogonal to both the axial direction A-A and the radial direction R-R.

Said brake pad 3 comprises at least one plate 9 and at least one friction material 10 supported by said plate 9.

Said friction material 10 comprises a friction material surface 32 adapted to abut against a braking band 102 of the brake disc 101, in which said friction surface 32 has a barycenter 15.

Said brake pad 3 has a main extension along the radial direction R-R and the tangential direction T-T. Said friction material 10 extends in the axial direction A-A from a central portion of said plate 9.

Said brake pad 3 defines at least one pad plane R-T perpendicular to said axial direction A-A.

Said plate 9 is provided with a first slot 11 and a second slot 12.

Said first slot 11 comprises a first slot edge 13 adapted to accommodate with clearance a first pin 4 mounted on the caliper body 6, and said second slot 12 comprises a second slot edge 14 adapted to accommodate with clearance a second pin 5 mounted on the caliper body 6.

Said first slot edge 13 comprises a first slot tangentially inner portion or first slot first portion 16, and said second slot edge 14 comprises a second slot radially outer portion or second slot first portion 17, such that in a forward braking condition, said brake pad 3 rests on said first pin 4 with said first slot first portion 16, and said brake pad 3 rests on said second pin 5 with said second slot first portion 17.

Advantageously, said first slot 11 is arranged in a radially outer position with respect to said barycenter 15 and said second slot 12 is arranged in a radially inner position with respect to said barycenter 15.

Advantageously, said first slot 11 and said second slot 12 are radially external with respect to a barycenter circumference centered on said rotation axis A and passing through said barycenter 15.

Within this disclosure, reference will be made to the position of the slots 11, 12 in the pad plane R-T irrespective of the axial position of the pad plane R-T with respect to the axial direction A-A, as if the brake pad 3 were observed in a view perpendicular to the rotation axis A of the brake disc 101. Moreover, the terms radially inner/internal and radially outer/external will refer to positions closer to and further away from the rotation axis A of the brake disc 101, respectively. Furthermore, the terms tangentially inner/internal and tangentially outer/external will refer to positions of the plate 9 closer to and further away from the friction material 10, respectively.

By virtue of this specific positioning of the first slot 11 and the second slot 12 with respect to the barycenter 15, it is possible to achieve a configuration of support and transfer of the friction force between pad and disc to the caliper body, which reduces the vibrations of the pad triggering the annoying whistles that can be heard by the human ear at low frequencies.

In accordance with an embodiment, said brake pad 3 has a centerline axis m-m coinciding with said radial direction R-R which divides said friction material 10 in half with respect to said tangential direction T-T, and said barycenter 15 is arranged along said centerline axis m-m.

In accordance with an embodiment, said friction material 10 comprises a radially outer edge 26 delimiting said friction material 10 in a direction opposite to said rotation axis A.

In accordance with an embodiment, said friction material 10 comprises a radially inner edge 27 delimiting said friction material 10 towards said rotation axis A.

In accordance with an embodiment, said friction material 10 comprises a first side edge 28 and a second side edge 29 which tangentially delimit said friction material 10 from opposite sides. In accordance with an embodiment, said first side edge 28 and said second side edge 29 are connected to said radially inner edge 27 and said radially outer edge 28.

In accordance with an embodiment, said first slot 11 is at least partially or totally radially internal with respect to a first tangential direction T1, where said first tangential direction T1 is parallel to said tangential direction T-T and tangent at least in a radially outer edge portion, or an extension thereof, to said radially outer edge 20. Said second slot 12 is radially internal with respect to said first tangential direction T1. In accordance with an embodiment, said first tangential direction T1 is the tangential direction contacting said radially outer edge in at least one point, where said friction material 10 is completely radially internal with respect to said first tangential direction T1.

In accordance with an embodiment, said first slot 11 and said second slot 12 are arranged at least partially, preferably at least said second slot 12 totally, between said first tangential direction T1 and said barycenter circumference.

In accordance with an embodiment, said first slot 11 is at least partially or totally tangentially external with respect to a first radial direction R1, where said first radial direction R1 is parallel to said radial direction R-R and tangent to at least one first side edge portion of said first side edge 28. In accordance with an embodiment, said first side edge portion is tangentially external with respect to other first side edge portions. In accordance with an embodiment, said first side edge 28 extends mainly along said first radial direction R1.

In accordance with an embodiment, said second slot 12 is tangentially external with respect to a second radial direction R2, where said second radial direction R2 is parallel to said radial direction R-R and tangent to at least one second side edge portion of said second side edge 29. In accordance with an embodiment, said second side edge portion is tangentially external with respect to other second side edge portions. In accordance with an embodiment, said second side edge 28 extends mainly along said second radial direction R2.

In accordance with an embodiment, said radially outer edge 26 comprises at least one outer edge arched portion 30, where said outer edge arched portion 30 sweeps a circumference portion of an outer edge circumference, where said outer edge circumference is centered in said rotation axis A and has an outer edge radius Rp. In accordance with an embodiment, said outer edge arched portion 30, or an extension thereof, intersects said centerline axis m-m. In accordance with an embodiment, said radially outer edge 26 comprises a further outer edge arched portion being specular with respect to said outer edge arched portion 30 with respect to said centerline axis m-m. Due to the provision of said outer edge arched portion 30 it is possible to trace the position of the axis of the brake disc 101 with respect to the brake pad 3, irrespective of the presence of the brake disc 101.

In accordance with an embodiment, said radially inner edge 27 comprises at least one inner edge arched portion 31, where said inner edge arched portion 31 sweeps a circumference portion of an inner edge circumference, where said inner edge circumference is centered in said rotation axis A and has an inner edge radius Rc. Due to the provision of said inner edge arched portion 31 it is possible to trace the position of the axis of the brake disc 101 with respect to the brake pad 3, irrespective of the presence of the brake disc 101.

In accordance with an embodiment, said first slot 11 and said second slot 12 are radially internal with respect to said outer edge circumference.

In accordance with an embodiment, said first slot 11 and said second slot 12 are arranged between said outer edge circumference and said barycenter circumference.

By virtue of the specific positioning of the first slot 11 so as to be tangentially external and radially external, and of the second slot 12 so as to be tangentially external and radially internal, both arranged above the barycenter circumference and below the outer edge circumference, an improved decrease of the pad frequencies, which can trigger low frequency whistles, was found.

In accordance with an embodiment, said plate 9 comprises a plate first ear or first protuberance 33 comprising said first slot 11. In accordance with an embodiment, said first ear 21 is in a radially outer position with respect to said rotation axis A and tangentially external with respect to said friction material 10.

In accordance with an embodiment, said plate 9 comprises a plate second ear or second protuberance 34. In accordance with an embodiment, said plate second ear or second protuberance 34 comprises said second slot 12. In accordance with an embodiment, said plate second ear or second protuberance 34 defines, with its contour, said second slot 12 having a partially open second slot profile. In accordance with an embodiment, said second ear 34 is in a radially inner position with respect to said rotation axis A and tangentially external with respect to said friction material 10. In accordance with an embodiment, said plate 9 comprises a discharge opening 48 at said second ear 34. In accordance with an embodiment, said discharge opening 48 is arranged radially outside with respect to said second slot 12. In accordance with an embodiment, said discharge opening 48 is circular.

In accordance with an embodiment, said first slot edge 13 defines a first slot profile and where said second slot edge 14 defines a second slot profile. In accordance with an embodiment, said first slot profile is closed. In accordance with an embodiment, said second slot profile is closed. In accordance with an embodiment, said second slot profile is partially open along said tangential direction T-T on the opposite side with respect to said friction material 10. In accordance with an embodiment, said second slot profile is partially open along said radial direction R-R towards said brake disc.

In accordance with an embodiment, said barycenter 15 is arranged at a barycenter radial distance Re from said rotation axis A. Said barycenter circumference has a radius equal to said radial barycenter distance Re.

In accordance with an embodiment, said first slot 11 is positioned at least partially at a first slot radial distance D1 with respect to said rotation axis A along a direction parallel to said radial direction R-R, where said first slot radial distance D1 is greater than said barycenter radial distance Re.

In accordance with an embodiment, said second slot 12 is positioned at least partially at a second slot radial distance D2 with respect to said rotation axis A along a direction parallel to said radial direction R-R, where said second slot radial distance D2 is smaller than said barycenter radial distance Re.

In accordance with an embodiment, said first slot edge 13 comprises a first slot tangentially outer portion or first slot second portion 18. In accordance with an embodiment, in a reverse braking condition, said brake pad 3 rests on said first pin 4 with said first slot second portion 18, and said brake pad 3 rests on said second pin 5 with said second slot first portion 17. In accordance with an embodiment, said first slot edge 13 comprises a first slot radially outer portion or first slot third portion 19. In accordance with an embodiment, in a braking release condition, said brake pad 3 contacts said first pin 4 at least with said first slot third portion 19. In accordance with an embodiment, said first slot third portion 19 comprises a first slot first convergent portion 20 and a first slot second convergent portion 21 mutually converging, so that in a braking release condition, said first pin 4 is wedged between said first slot first convergent portion 20 and said first slot second convergent portion 21 reaching a rest position. In accordance with an embodiment, said first slot first convergent portion 20 is parallel to said first slot second portion 18, preferably along said radial direction R-R. In accordance with an embodiment, said first slot first convergent portion 20 and said first slot second convergent portion 21 are inclined with respect to said tangential direction T-T. In accordance with an embodiment, said first slot third portion 19 comprises a connecting portion 22 which connects said first convergent portion 30 to said second convergent portion 31. In accordance with an embodiment, said connecting portion 29 is parallel to said tangential direction T-T or is curvilinear. In accordance with an embodiment, said first slot 11, i.e., said first slot profile, is circular and said first slot portions are circular. In accordance with an embodiment, said first slot 11, i.e., said first slot profile, is pentagonal, preferably irregular, where said first slot portions are rectilinear. In accordance with an embodiment, said first slot 11, i.e., said first slot profile, is hexagonal, preferably irregular. In accordance with an embodiment, said second slot 12 is rectangular.

In accordance with an embodiment, said first slot edge 13 comprises a first slot radially outer portion or first slot third portion 19, where said second slot edge 14 comprises a second slot tangentially inner portion or second slot second portion 24, where in a reverse braking condition, said brake pad 3 rests on said first pin 4 with said first slot third portion 19, and said brake pad 3 rests on said second pin 5 with said second slot second portion 24. In accordance with an embodiment, said first slot edge 13 comprises a first slot curvilinear portion 23 which connects said first slot third portion 19 to said first slot first portion 16, where switching from said forward braking condition to a braking release condition, said brake pad 3 is slidably guided on said first pin 4 with said first slot curvilinear portion 23, where in said braking release condition, said brake pad 3 rests on said first slot third portion 19. In accordance with an embodiment, said second slot edge 14 comprises a second slot curvilinear portion 25 which connects said second slot first portion 17 to said second slot second portion 24, where switching from said reverse braking condition to a braking release condition, said brake pad 3 is slidably guided on said second pin 5 with said second slot curvilinear portion 25. In accordance with an embodiment, said second slot edge 14 is partially open and solely comprises said second slot curvilinear portion 25, said second slot first portion 17, and said second slot second portion 24. In accordance with an embodiment, said first slot edge 13 comprises at least four rectilinear portions and one arched portion. In accordance with an embodiment, said second slot edge 14 comprises at least three rectilinear portions and one arched portion. In accordance with an embodiment, said second slot profile is specular to said first slot profile with respect to said radial direction R-R, preferably with respect to said centerline axis m-m.

Due to the provision of said first slot 11 and said second slot 12 forming a closed profile, it is possible to have a high strength and robustness of the brake pad.

The present invention also relates to a brake caliper assembly 1.

Said brake caliper assembly 1 comprises a brake caliper 2 for a disc brake 100 of a vehicle, said disc brake 100 comprising a disc brake 101 and defining an axial direction A-A either coinciding with or parallel to the brake disc rotation axis A, a radial direction R-R, orthogonal to the axial direction A-A, and a tangential or circumferential direction T-T, orthogonal to both the axial direction A-A and the radial direction R-R.

Said brake caliper assembly 1 comprises at least one brake pad 3 ac-cording to one or more of the previously described embodiments.

Said brake caliper assembly 1 comprises a first pin 4 and a second pin 5 configured to support said brake pad 3 and discharge a braking force from said brake pad 3 to said brake caliper 2.

In accordance with an embodiment, said caliper assembly 1 comprises a pad spring 35 configured to constantly elastically bias a respective pad 3 in a radial direction so that, in the braking release condition, the pad 3 is arranged with the slots in contact with the pins in the rest position.

In accordance with an embodiment, said brake caliper 2 comprises a caliper body 6 adapted to be arranged straddling said brake disc 101, and at least one thrust device 7, 8 connected to said caliper body 6 and said at least one brake pad 3 to abut said at least one brake pad 3 against said braking band 102.

Said at least one thrust device 7, 8 has a respective thrust area Ai and a thrust device center, where said thrust device center is arranged at a thrust device distance Ri with respect to said brake disc rotation axis A.

Said brake caliper 2 has a thrust center 36 substantially centered on said barycenter 15, where the resulting friction force between said brake pad and brake disc is concentrated. Said thrust center 36 is arranged at a radial distance from the rotation axis A equal to said barycenter radial distance Re.

In accordance with an embodiment, said barycenter radial distance Re is equal to the ratio of a sum of the product of the thrust area Ai by the respective thrust device distance Ri of each thrust device 7, 8 with a sum of the thrust area Ai of each thrust device 7, 8, according to the formula $$T_E = 0$$
$$R_E = \frac{\sum_{i=1}^{n} R_i A_i}{\sum_{i=1}^{n} A_i}$$

In accordance with an embodiment, said first pin 4 comprises a first pin axis a-a and said second pin 5 comprises a second pin axis b-b.

Said first pin axis a-a is arranged at a first pin radial distance with respect to said rotation axis A along said direction parallel to said radial direction R-R, where said first pin radial distance is equal to said first slot radial distance D1.

Said second pin axis b-b is arranged at a second pin distance with respect to said rotation axis A along said direction parallel to said radial direction R-R, where said second pin radial distance is equal to said second slot radial distance D2.

Said second pin axis b-b and said first pin axis a-a are arranged outside said thrust center circumference.

In accordance with an embodiment, said caliper body 6 comprises at least a first elongated portion 39 and a second elongated portion 40 connected by at least one connecting portion 41, where said first elongated portion 39 is opposite to said second elongated portion 40 with respect to said brake disc 101. In agreement with an embodiment, said connecting portion 41 comprises a central bridge and two peripheral connecting portions. In accordance with an embodiment, said first elongated portion 39 and/or said second elongated portion comprise at least one thrust device housing to accommodate the corresponding thrust device 7, 8.

In accordance with an embodiment, said first elongated portion 39 comprises a first pin housing 42, where said first pin housing 42 is configured to accommodate said first pin 4 at a first pin end portion 44 thereof, respectively.

In accordance with an embodiment, said first elongated portion 39 comprises a second pin housing 46, where said second pin housing 46 is configured to accommodate said second pin 5 at a second pin end portion 48 thereof, respectively.

Said first pin housing 42 has a first pin housing axis g-g and is coaxial with said first pin 4. Said second pin housing 46 is coaxial with said second pin 5 and has a second pin housing axis h-h.

Said first pin housing axis g-g and said second pin housing axis h-h are arranged at a radial distance with respect to said rotation axis A equal to said first slot radial distance D1 and said second slot radial distance D2, respectively, and are arranged outside of said barycenter circumference.

The present invention also relates to a disc brake 100 for a vehicle.

Said disc brake 100 comprises a brake disc 101 having a rotation axis A and comprising a braking band 102.

Said disc brake 100 comprises a caliper assembly 1 ac-cording to at least one of the previously described embodiments.

By virtue of the suggested solutions, it is possible to obtain brake pads having improved performance in reducing the low frequencies which can put the brake pad in resonance and generate annoying whistles on hearing.

Due to the positioning of the first slot and the second slot with respect to the barycenter 15 of the pad and with respect to the edges of the friction material, a marked decrease in low frequency vibrations was experimentally observed compared to other configurations of arrangement of the brake pad slots.

Furthermore, due to the provision of pad support pins coaxial with respective pin housings obtained in the caliper body, inserted into the respective pad slots, it is possible to create caliper assemblies and brake discs for a vehicle which allow reducing the vibrational frequencies at low frequencies, between pad and caliper body and brake disc, thus reducing if not eliminating the generation of whistles during a forward and/or reverse braking, according to the configurations of the suggested solutions.

LIST OF REFERENCE SIGNS 1 brake caliper assembly
2 brake caliper
3 brake pad
4 first pin
5 second pin
6 caliper body
7 first thrust device
8 second thrust device
9 plate
10 friction material
11 first slot
12 second slot
13 first slot edge
14 second slot edge
15 barycenter
16 first slot tangentially inner portion or first slot first portion
17 second slot radially outer portion or second slot first portion
18 first slot tangentially outer portion or first slot second portion
19 first slot radially outer portion or first slot third portion
20 first slot first convergent portion
21 first slot second convergent portion
22 first slot connecting portion
23 first slot curvilinear portion
24 second slot tangentially inner portion or second slot second portion
25 second slot curvilinear portion
26 friction material radially outer edge
27 friction material radially inner edge
28 friction material first side edge
29 friction material second side edge
30 outer edge arched portion
31 inner edge arched portion
32 friction material surface
33 plate first ear or first protuberance
34 plate second ear or second protuberance
35 pad spring
36 thrust center
39 caliper body first elongated portion
40 caliper body second elongated portion
41 caliper body connecting portion
42 first pin housing
44 first pin first end portion
45 first pin second end portion
46 second pin housing
47 second pin first end portion
48 discharge opening
100 disc brake
101 brake disc
102 braking band
a-a first pin axis
b-b second pin axis
g-g first pin housing axis
h-h second pin housing axis
m-m centerline axis
Re thrust center radial distance
Ri thrust device distance
Ai thrust device thrust area
D1 first slot radial distance
D2 second slot radial distance
Rp outer edge radius
Rc inner edge radius
R1 first rectilinear direction
R2 second rectilinear direction
T1 first tangential direction
A rotation axis
A-A axial direction
T-T circumferential or tangential direction
R-R radial direction

What is claimed is:

1. A brake pad for a brake caliper, wherein said brake caliper comprises a caliper body adapted to be arranged straddling a brake disc,
said brake pad defining an axial direction, either coinciding with, or parallel to the rotation axis of the brake disc, a radial direction, orthogonal to the axial direction, and a tangential direction or a circumferential direction, orthogonal with both the axial direction and the radial direction;

wherein said brake pad comprises at least one plate and at least one friction material supported by said plate; wherein said friction material comprises a friction material surface adapted to abut against a braking band of the brake disc, wherein said friction material surface has a barycenter, wherein said plate has prevalent extension along the radial and tangential directions;
wherein said plate is provided with a first slot and a second slot,
wherein said first slot comprises a first slot edge adapted to accommodate with clearance a first pin mounted on the caliper body,
wherein said second slot comprises a second slot edge adapted to accommodate with clearance a second pin mounted on the caliper body,
wherein said first slot edge comprises a first slot tangentially inner portion or first slot first portion, and wherein said second slot edge comprises a second slot radially outer portion or second slot first portion, such that in a forward braking condition, said brake pad rests on said first pin with said first slot first portion, and said brake pad rests on said second pin with said second slot first portion,
wherein said first slot is arranged in a radially outer position relative to said barycenter and said second slot is arranged in a radially inner position relative to said barycenter,
wherein said first slot and said second slot are radially outer relative to a barycenter circumference centered on said rotation axis and passing through said barycenter.

2. The brake pad according to claim 1, wherein said friction material comprises a radially outer edge which delimits said friction material in a direction opposite to said rotation axis,
   wherein said first slot is at least partially or totally radially inner relative to a first tangential direction,
   wherein said first tangential direction is parallel to said tangential direction and tangent at least in a radially outer edge portion, or an extension thereof, to said radially outer edge,
   and/or wherein said brake pad has a centerline axis which coincides with said radial direction which divides said friction material in half relative to said tangential direction, wherein said barycenter is arranged along said centerline axis,
   and/or wherein said friction material comprises a first side edge and a second side edge which tangentially delimit said friction material from opposite sides,
   wherein said second slot is tangentially outer relative to a second radial direction, wherein said second radial direction is parallel to said radial direction and tangent to at least one second side edge portion, and wherein said first slot is at least partially or totally tangentially outer relative to a first radial direction R1, wherein said first radial direction is parallel to said radial direction and tangent to at least one first side edge portion of said first side edge,
   and/or wherein said friction material comprises a radially inner edge which delimits said friction material towards said rotation axis.

3. The brake pad according to claim 2,
   wherein said first slot is tangentially outer relative to said first side edge,
   and/or wherein said radially outer edge comprises at least one outer edge arched portion, wherein said outer edge arched portion sweeps a circumferential portion of an outer edge circumference,
   wherein said outer edge circumference is centered in said rotation axis and has an outer edge radius,
   wherein said first slot and said second slot are inner relative to said outer edge circumference;
   and/or wherein said first slot 11 and said second slot 12 are arranged, between said outer edge circumference and said barycenter circumference;
   and/or wherein said radially inner edge comprises at least one inner edge arched portion, wherein said inner edge arched portion sweeps a circumferential portion of an inner edge circumference,
   wherein said inner edge circumference is centered in said rotation axis and has an inner edge radius.

4. The brake pad according to claim 1, wherein said first slot edge comprises a first slot tangentially outer portion or first slot second portion,
   wherein in a reverse braking condition, said brake pad rests on said first pin with said first slot second portion and said brake pad rests on said second pin with said second slot first portion.

5. The brake pad according to claim 4, wherein said first slot edge comprises a first slot radially outer portion or first slot third portion, wherein in a braking release condition said brake pad comes into contact said first pin at least with said first slot third portion,
   and/or wherein said first slot third portion comprises a first slot first convergent portion and a first slot second convergent portion, mutually converging so that in a braking release condition, said first pin is wedged between said first slot first convergent portion and said first slot second convergent portion reaching a rest position,
   and/or wherein said first slot third portion comprises a connecting portion which connects said first convergent portion to said second convergent portion, wherein said connecting portion is either parallel to said tangential direction or is curvilinear,
   and/or wherein said first slot is circular, or wherein said first slot edge comprises at least five rectilinear portions forming a pentagonal or hexagonal profile,
   and/or wherein said second slot is rectangular.

6. The brake pad according to claim 1,
   wherein said first slot edge comprises a first slot radially outer portion or first slot third portion, and
   wherein said second slot edge comprises a second slot tangentially inner portion or second slot second portion, such that in a reverse braking condition, said brake pad rests on said first pin with said first slot third portion, and said brake pad rests on said second pin with said second slot second portion.

7. The brake pad according to claim 6,
   wherein said first slot edge comprises a first slot curvilinear portion which connects said first slot third portion to said first slot first portion, wherein passing from said forward braking condition to a braking release condition, said brake pad is smoothly guided on said first pin with said first slot curvilinear portion, wherein in said braking release condition said brake pad rests on said first slot third portion,
   and/or wherein said second slot edge comprises a second slot curvilinear portion which connects said second slot first portion to said second slot second portion, wherein passing from said reverse braking condition to a braking release condition, said brake pad is slidably guided on said second pin with said second slot curvilinear portion,
   and/or wherein said first slot edge comprises at least four straight portions and one arched portion, and/or wherein said second slot edge comprises at least three straight portions and one arched portion, and/or wherein said second slot profile is specular to said first slot profile relative to said radial direction.

8. The brake pad according to claim 1, wherein said plate comprises a first ear or plate first protuberance comprising said first slot and a second ear or plate second protuberance comprising said second slot, wherein said first ear is in a radially outer and tangentially outer position and wherein said second ear is in a radially inner and tangentially outer position, and/or wherein said first slot edge defines a slot first profile and wherein said slot second edge defines a slot second profile, wherein said slot first profile is closed, and wherein said slot second profile is closed or wherein said slot second profile is partially open along said tangential direction on the opposite side relative to said friction material and/or is partially open along said radial direction towards said brake disc, and/or wherein said barycenter is arranged at a barycenter radial distance from said rotation axis, wherein said first slot is positioned at least partially at a first slot radial distance relative to said rotation axis along a direction parallel to said radial direction, wherein said first slot radial distance is greater than said barycenter radial distance, wherein said second slot is positioned at least partially at a second slot radial distance relative to said rotation axis along a direction parallel to said radial direction, wherein said second slot radial distance is lower than said barycenter radial distance, wherein said barycenter circumference has a radius equal to said radial barycenter distance.

9. The brake caliper assembly comprising a brake caliper for disc brake of a vehicle, said disc brake comprising a disc brake and defining an axial direction either coinciding with, or parallel to the brake disc rotation axis, a radial direction, orthogonal to the axial direction, and a tangential or circumferential direction, to both the axial direction and the radial direction, at least one brake pad according to any one of the preceding claims connected to said brake caliper, a first pin and a second pin configured to support said brake pad and to discharge a braking force from said brake pad to said brake caliper.

10. The brake caliper assembly according to claim 9, wherein said brake caliper comprises a caliper body adapted to be arranged straddling said brake disc, and at least one thrust device connected to said caliper body and said at least one brake pad to abut said at least one brake pad against said braking band, wherein said at least one thrust device has a respective thrust area and a thrust device center, wherein said thrust device center is arranged at a thrust device distance relative to said brake disc rotation axis, wherein said brake caliper has a thrust center centered on said barycenter, and/or wherein said barycenter radial distance is equal to the ratio of a sum of the product of the thrust area by the respective thrust device distance of each thrust device, and a sum of the thrust area of each thrust device, according to the formula $$T_E = 0$$

$$R_E = \frac{\sum_{i=1}^{n} R_i A_i}{\sum_{i=1}^{n} A_i}$$

11. The brake caliper assembly according to claim 10, wherein said first pin comprises a first pin axis, wherein said second pin comprises a second pin axis, wherein said first pin axis is arranged at a first pin radial distance from said rotation axis along said direction parallel to said radial direction, wherein said first pin radial distance is equal to said first slot radial distance, wherein said second pin axis is arranged at a second pin distance relative to said rotation axis along said direction parallel to said radial direction, wherein said second pin radial distance is equal to said second slot radial distance, and wherein said second pin axis and said first pin axis are arranged outside said thrust center circumference, and/or wherein said caliper body comprises at least a first elongated portion and a second elongated portion connected by at least one connecting portion, wherein said first elongated portion is opposite to said second elongated portion relative to said brake disc, wherein said first elongated portion comprises a first pin housing, wherein said first pin housing is configured to accommodate said first pin respectively at an end portion of said first pin, wherein said first elongated portion comprises a second pin housing, wherein said second pin housing is configured to accommodate said second pin respectively at an end portion of said second pin, wherein said first pin housing has a first pin housing axis, and wherein said second pin housing has a second pin housing axis, wherein said first pin housing axis and said second pin housing axis are arranged at a radial distance relative to said rotation axis equal to said first slot radial distance and said second slot radial distance, respectively, and are arranged outside of said thrust center circumference, and/or wherein said caliper assembly comprises a further brake pad which is specular to said at least one brake pad.

12. A disc brake for a vehicle, comprising a brake disc having a rotation axis and comprising a braking band, and a caliper assembly according to claim 9.

* * * * *